US009363982B2

(12) United States Patent
Fleming et al.

(10) Patent No.: US 9,363,982 B2
(45) Date of Patent: Jun. 14, 2016

(54) DETANGLING LEAD ASSEMBLY

(71) Applicant: PB&JM, LLC, Carson City, NV (US)

(72) Inventors: Jan Fleming, Cedar Ridge, CA (US);
Bianca Kleintjes, Carson City, NV (US); P. Chris Kleintjes, Carson City, NV (US)

(73) Assignee: PB&JM, LLC, Carson City, NV (US)

( * ) Notice: Subject to any disclaimer, the term of this patent is extended or adjusted under 35 U.S.C. 154(b) by 0 days.

(21) Appl. No.: 14/398,150

(22) PCT Filed: Apr. 29, 2013

(86) PCT No.: PCT/US2013/038698
§ 371 (c)(1),
(2) Date: Oct. 31, 2014

(87) PCT Pub. No.: WO2013/165922
PCT Pub. Date: Nov. 7, 2013

(65) Prior Publication Data
US 2015/0090196 A1    Apr. 2, 2015

Related U.S. Application Data

(60) Provisional application No. 61/640,733, filed on May 1, 2012.

(51) Int. Cl.
*A01K 27/00* (2006.01)
*B66D 1/74* (2006.01)

(52) U.S. Cl.
CPC ............ *A01K 27/003* (2013.01); *B66D 1/7415* (2013.01)

(58) Field of Classification Search
CPC ................ A01K 27/00; A01K 27/003; A01K 27/004005; B66D 1/7415; B66D 3/04; B66D 3/046; B66D 2700/0183

USPC ......................................... 119/769, 795, 797
See application file for complete search history.

(56) References Cited

U.S. PATENT DOCUMENTS 3,707,141 A * 12/1972 Boer et al. .................... 119/458
3,709,548 A   1/1973 Hogshead
(Continued)

FOREIGN PATENT DOCUMENTS

JP    2005328814    12/2005

OTHER PUBLICATIONS

Casini, Virgil J., Jul. 2000, NIOSH In-house FACE Report, http://www.cdc.gov/niosh/face/In-house/full200007.html.*

(Continued)

*Primary Examiner* — Monica Williams
*Assistant Examiner* — Christopher Hutchens
(74) *Attorney, Agent, or Firm* — John Brooks Law LLC; John J Brooks, III

(57) ABSTRACT

A detangling lead assembly comprising an elongated flexible lead having a first lead end and a second lead end, a body subassembly comprising a pulley, the lead retained in a lead path from a distal end of the body assembly, around the pulley and extending from the distal end of the body subassembly whereby the first lead end and the second lead end extend generally in a distal direction from the handle subassembly and the lead is generally movable back and forth around the pulley. In some embodiments, the lead assembly further comprises a handle subassembly rotatably coupled to a proximal end of the body subassembly. In some embodiments, the housing further comprises exit points for the lead ends defining a moment arm for a moment to force the body subassembly to rotate and uncross a crossing of the lead ends.

17 Claims, 9 Drawing Sheets

(56) References Cited

U.S. PATENT DOCUMENTS

| | | | |
|---|---|---|---|
| 4,139,179 A | | 2/1979 | Kukulski |
| 4,598,792 A | * | 7/1986 | Lew et al. ............... 182/42 |
| 4,879,972 A | | 11/1989 | Crowe et al. |
| 4,892,063 A | | 1/1990 | Garrigan |
| 5,377,626 A | * | 1/1995 | Kilsby et al. ............ 119/796 |
| 5,632,234 A | * | 5/1997 | Parker ..................... 119/795 |
| 5,701,848 A | * | 12/1997 | Tozawa .................. 119/797 |
| 5,724,921 A | * | 3/1998 | Bell ........................ 119/795 |
| 5,901,668 A | | 5/1999 | Goodger, Sr. |
| 6,240,881 B1 | * | 6/2001 | Edwards et al. ........ 119/795 |
| 6,247,428 B1 | * | 6/2001 | Mireles ................... 119/795 |
| 6,273,029 B1 | | 8/2001 | Gish |
| 6,439,168 B1 | | 8/2002 | Maglich et al. |
| 6,474,270 B1 | | 11/2002 | Imes |
| 6,557,219 B2 | | 5/2003 | Smith et al. |
| 6,792,893 B1 | | 9/2004 | Quintero |
| 7,926,451 B2 | | 4/2011 | Foster |
| 8,393,302 B1 | * | 3/2013 | Blakemore ............. 119/796 |
| 2006/0070584 A1 | | 4/2006 | Larouche |
| 2006/0185618 A1 | * | 8/2006 | Hetland .................. 119/795 |
| 2006/0201449 A1 | * | 9/2006 | DiDonato ............... 119/795 |
| 2007/0193005 A1 | | 8/2007 | Chalk |
| 2009/0178627 A1 | | 7/2009 | Bentz et al. |
| 2011/0180017 A1 | | 7/2011 | Goldenberg |
| 2012/0137475 A1 | * | 6/2012 | Seader .................... 24/129 R |
| 2014/0299411 A1 | * | 10/2014 | Aldred et al. ........... 182/5 |

OTHER PUBLICATIONS

Paws Republic, "The Freedom Leash" product description, as downloaded from the web site www.thepawsrepublic.com/Freedom-Leash-3100.htm on Apr. 2, 2013, 2 pgs.

Yang, In Su, International Search Report and Written Opinion from parent PCT case, PCT App. No. PCT/US2013/038698, mailed Sep. 25, 2013, 13 pages, Korean Intellectual Property Office, Republic of Korea.

www.Amazon.com, "Dual Doggie Pet Leash", as downloaded from web site http://www.amazon.com/Wigzi-Dual-Doggie-Pet-Leash/dp/B00B5N4KJI on Oct. 16, 2014, 1 pg.

* cited by examiner

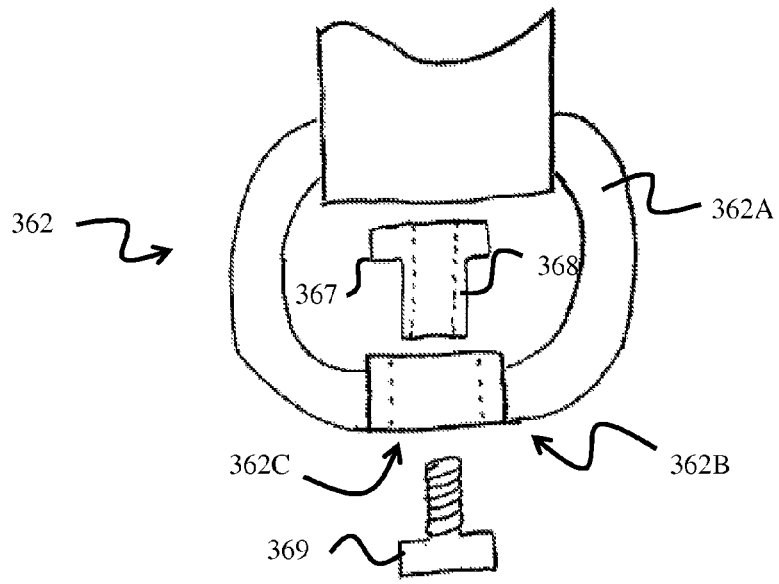
FIG. 3B
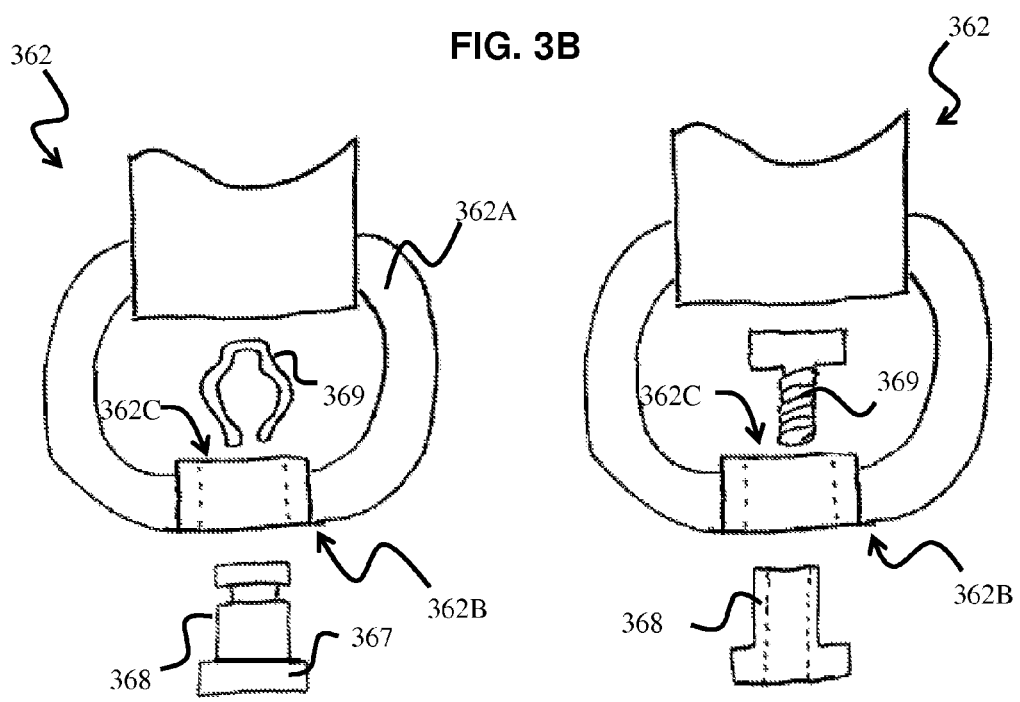
FIG. 3C
FIG. 3D

DETANGLING LEAD ASSEMBLY

CROSS-REFERENCE TO RELATED APPLICATIONS

This application claims the benefit of U.S. App. No. 61/640,733, filed on May 1, 2012, entitled "TWO LEASH SYSTEM," the entire contents of which are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to devices to automatically detangle multiple lends of a flexible lead, in one embodiment, the devices are used for animal leashes that can be used with more than one animal at one time.

2. Description of the Prior Art

Various embodiments of a multiple lead devices, such as multiple pet leash assemblies have been disclosed. For example, U.S. Pat. No. 5,632,234, filed Aug. 16, 1995 to Gerald C. Parker and entitled "Two-Pet Leash" (hereafter "Parker"), which is herein incorporated by reference in its entirety, discloses a multiple pet leash assembly having a single leash running though a pulley with a handle to restrain the pulley and leash.

A multiple pet leash assembly sold under the trade name of the Freedom Leash by Paws Republic and sold online at www.petco.com and at retail stores by PetCo San Diego, Calif. USA, has dual retractable leashes extending from a body that can spin to try to prevent the two leashes from tangling with each other.

The Dual Doggie leash assembly sold online at www.wigzi.com by Wigzi LLC of Washington D.C. is also a two pet leash having dual retractable leashes that spin relative to a handle to try to prevent the two leashes from tangling with each other.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented.

In one example embodiment, a lead assembly is configured as a dual leash having a rotating swivel coupler and a crossover lead pulley system which prevents the leash leads from tangling and allows the lead lengths to adjust based on the position of the animals attached.

In one example embodiment, a lead assembly is provided comprising a body subassembly having a pulley, an elongated flexible lead retained in a lead path from a distal end of the body around the pulley and extending from the distal end of the body subassembly whereby a first lead end and a second lead end extend generally in a distal direction from the body subassembly and the lead is generally movable back and forth around the pulley. In some embodiments, the assembly further comprises a handle rotatably coupled to a proximal end of the body subassembly whereby the body subassembly can rotate relative to the handle and uncross a crossing of the lead ends. In some embodiments, the body subassembly further comprises exit points for the lead ends defining a moment arm whereby the moment forces the body subassembly to rotate to uncross a crossing of the lead ends.

In one example embodiment, a detangling lead assembly is provided comprising a handle subassembly rotatably coupled to a proximal end of a body subassembly, an elongated flexible lead having a first lead end and a second lead end, the body subassembly comprising a pulley and the lead following a lead path from a distal end of the body assembly, around the pulley and extending from the distal end of the body subassembly whereby the first lead end and the second lead end extend generally in a distal direction from the handle subassembly and the lead is generally movable back and forth around the pulley.

In some embodiments, the lead is removably retained in the lead path whereby the lead can be removed and replaced with a replacement lead.

In some embodiments, the lead path through the body subassembly causes an overlap of the lead over itself in an overlap location distal to the pulley.

In some embodiments, the overlap of the lead over itself is configured to provide a frictional engagement of an outside surface of the lead creating a resistance force opposite a pulling force on the lead.

In some embodiments, the handle coupler is configured to provide a coupling that restricts movement of the handle subassembly in directions other than rotation about the longitudinal axis of the assembly.

In some embodiments, the body subassembly further comprises a housing.

In some embodiments, the housing has a distal end having a first and a second lead eyelet defining a first and second exit point respectively for the lead from the housing.

In some embodiments, the first and second lead eyelets are separated by an eyelet offset distance between an inside edge of the first and second eyelet and the eyelet offset distance is greater than an inside groove diameter of the pulley.

In some embodiments, the housing comprises two shell halves sharing a same shell half design, the two shell halves are removably coupled and the lead is removably retained in the lead path whereby the lead can be removed and replaced with a replacement lead.

In some embodiments, the lead path through the body subassembly causes an overlap of the lead over itself in an overlap location distal to the pulley, the overlap of the lead over itself is configured to provide a frictional engagement of an outside surface of the lead creating a resistance force opposite a pulling force on the lead and the housing further comprises a lead channel defining the lead path through the body subassembly whereby the lead in the housing is less susceptible to tangling in the housing.

In some embodiments, the overlap of the lead is aligned with an overlap throat of the lead channel whereby an inside diameter of the overlap throat frictionally engages the outside surface of the lead and increases the resistance force opposite the pulling force on the lead.

In some embodiments, the detangling lead assembly further comprises an accessory connector coupled to the housing.

In some embodiments, the detangling lead assembly is configured to attach to multiple pets, the lead is removably retained in the lead path whereby the lead can be removed and replaced with a replacement lead, the first and second eyelets are separated by an eyelet offset distance between an inside edge of the first and second eyelet and the eyelet offset distance is greater than an inside groove diameter of the pulley, the housing comprises two shell halves sharing a same shell half design, the two shell halves are removably coupled and the lead is removably retained in the lead path whereby the lead can be removed and replaced with a replacement lead, the first lead end and the second lead end further comprise a lead swivel clip whereby the lead can be rotatably coupled to a pet collar and reduce a twisting of the lead, the first lead end and the second lead end further comprise a first and second stopper respectively configured with a stopper profile sized larger than the first and second eyelet whereby the first and second lead stoppers restrict the lead at a stop point from being movable back and forth around the pulley and the handle subassembly comprising a flexible loop strap.

In one example embodiment, a lead assembly is provided comprising a body subassembly, a single lead received in the body subassembly, the single lead having a first lead end and a second lead end, the first lead end extending from the body subassembly at a first lead end length and the second lead end extending from the body subassembly at a second end length, a means to adjust the first lead end length and the second lead end length and a means to rotatably anchor the body subassembly whereby the body subassembly rotates in reaction to one or more moments to avoid the first lead end wrapping around the second lead end.

In some embodiments, the means to adjust the first lead end length and the second lead end length comprises a pulley wheel rotatable coupled to the body subassembly, the single lead received in the body subassembly within a lead path, the lead path comprising a channel from a distal end of the body subassembly around the pulley and extending to the distal end of the body subassembly whereby the first lead end and the second lead end extend from the body subassembly and the lead path causes an overlap of the lead over itself in an overlap location distal to the pulley.

In some embodiments, the means to rotatably anchor the body subassembly comprises a handle coupler rotatably coupling the handle subassembly to the body subassembly.

In some embodiments, the body subassembly further comprises a first and second eyelet defining a first and second exit of the lead path from a distal end of the body assembly, the first and second lead eyelets are separated by an eyelet offset distance between an inside edge of the first and second eyelet and the eyelet offset distance is greater than an inside groove diameter of the pulley.

In some embodiments, the body subassembly comprises a housing having two shell halves, the shell halves having a same shell half design, the two shell halves are removably coupled and the lead is removably retained in the lead path whereby the lead can be removed and replaced with a replacement lead when the shell halves are removed.

In some embodiments, the overlap of the lead over itself is configured to provide a frictional engagement of an outside surface of the lead creating a resistance force opposite a pulling force on the lead and the housing further comprises a lead channel defining the lead path through the body subassembly whereby the lead in the housing is less susceptible to tangling in the housing.

In some embodiments, the lead assembly is configured to attach to multiple pets, the handle coupler is configured to provide a coupling that restricts movement of the handle subassembly in directions other than rotation about the longitudinal axis of the assembly and the means to adjust the first lead end length and the second lead end length further comprises the first lead end and the second lead end having a first and second stopper respectively configured with a stopper profile sized larger than the first and second eyelet whereby the first and second lead stoppers restrict the lead at a first and second stop point further restricting the lead from being movable back and forth around the pulley.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only example embodiments of the invention and are not therefore to be considered to be limiting of its scope, the invention will be described and explained with additional specificity and detail through the use of the accompanying drawings in which:

FIG. 3B is a top view of one example embodiment of the handle coupler;

FIG. 3C is a top view of one example embodiment of the handle coupler;

FIG. 3D is a top view of one example embodiment of the handle coupler;

DETAILED DESCRIPTION OF THE INVENTION

A detangling lead assembly will now be described in detail with reference to the accompanying drawings. It will be appreciated that, while the following description focuses on an assembly that is suitable for walking two pets with one leash assembly, the systems and methods disclosed herein have wide applicability. For example, the detangling lead assembly described herein may also be readily employed with firefighters or helicopter rescue crews pulling multiple loads, such as rescue victims, simultaneously with a single lead assembly, with cargo carriers hanging multiple loads with a single lead assembly or with parents having multiple children in harnesses secured with the leads of the assembly. Notwithstanding the specific example embodiments set forth below, all such variations and modifications that would be envisioned by one of ordinary skill in the art are intended to fall within the scope of this disclosure.

The detangling lead assembly generally comprises a body subassembly, a lead, a pulley and a rotatable connector. The body subassembly generally couples components of the assembly together. The lead is an elongated, generally flexible member configured for carrying a load. The lead is retained in a lead path from a distal end of the body subassembly, around the pulley and extending from a distal end of the body subassembly whereby a first lead end and a second lead end extend generally in a distal direction from the body subassembly. The lead path around the pulley allows the lead to be generally movable back and forth from the body subassembly around the pulley and provides a means to adjust the first lead end length and the second lead end length. The rotatable connector generally rotatably couples the body subassembly to an anchoring subassembly such as handle.

Embodiments of the lead assembly may provide a single lead pulley based swiveling system with two extending crossover leads allowing the two leads to be extended from the lead assembly while the lead assembly is configured to automatically detangle the leads if they get crossed. For embodiments used as a leash for multiple pets, the assembly allows the pet freedom to cross paths without the leash becoming tangled and also enables the user to control the overall amount of slack the pets have between them.

Figure 1A:
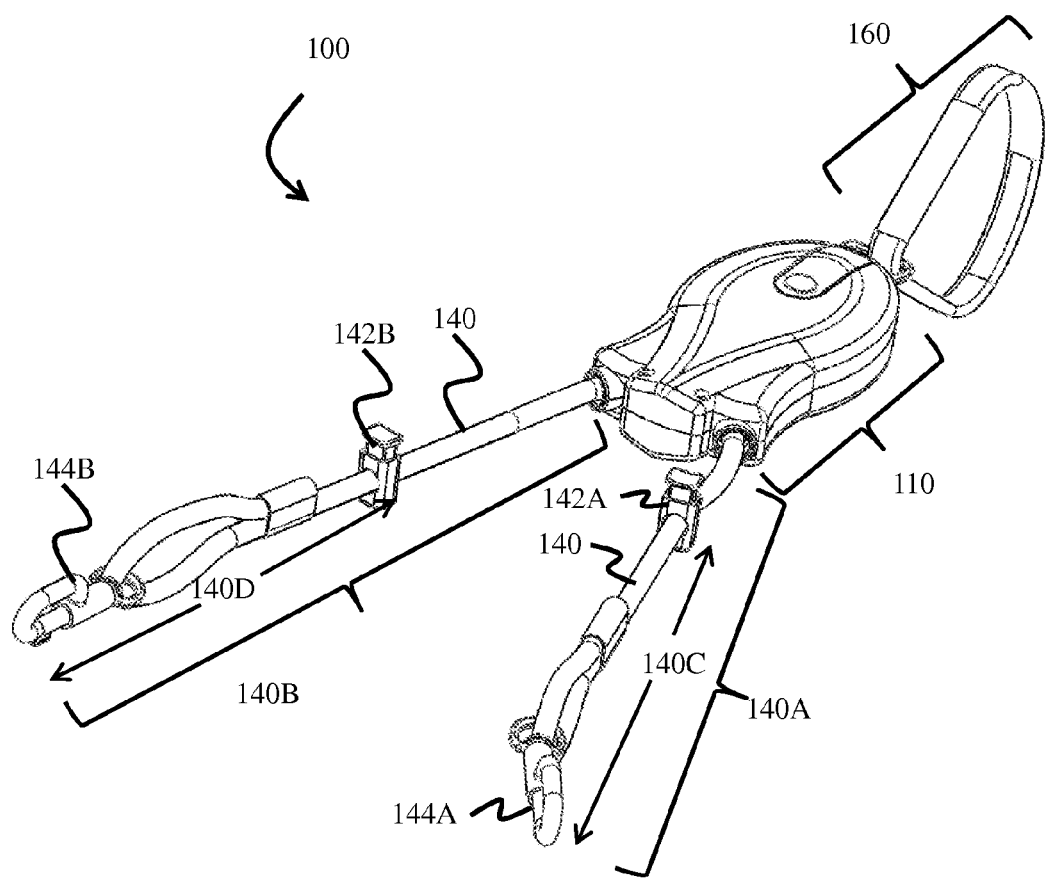
FIG. 1A is a top perspective view of one example embodiment of the detangling lead assembly, here a multiple pet leash assembly.

One Embodiment of the Detangling Lead Assembly:

For illustration purposes and not for limitation, one embodiment of the present invention is shown in FIG. 1A. As shown in FIG. 1A, the detangling lead assembly 100 comprises an anchoring subassembly, here a handle subassembly 160, coupled to a body subassembly 110, a pulley wheel (not shown) and an elongated flexible lead 140 with multiple ends extending from the distal end of the body subassembly 110. A portion of the lead 140 is retained in a lead path within the body subassembly 110, the lead path extending from the distal end of the body assembly 110, around the pulley wheel and extending to the distal end of the body subassembly 110. As shown, the first lead end 140A and the second lead end 140B extend generally in a distal direction from the body subassembly 110 and the lead 140 is generally movable back and forth relative to the body subassembly 110 around the pulley wheel.

It is understood that the lead length shown in FIG. 1A is not to scale and that embodiments may have longer lengths of first and second lead ends, 140A and 140B respectively or longer lengths of other portions of the lead extending from the body subassembly 110.

Figure 2A:
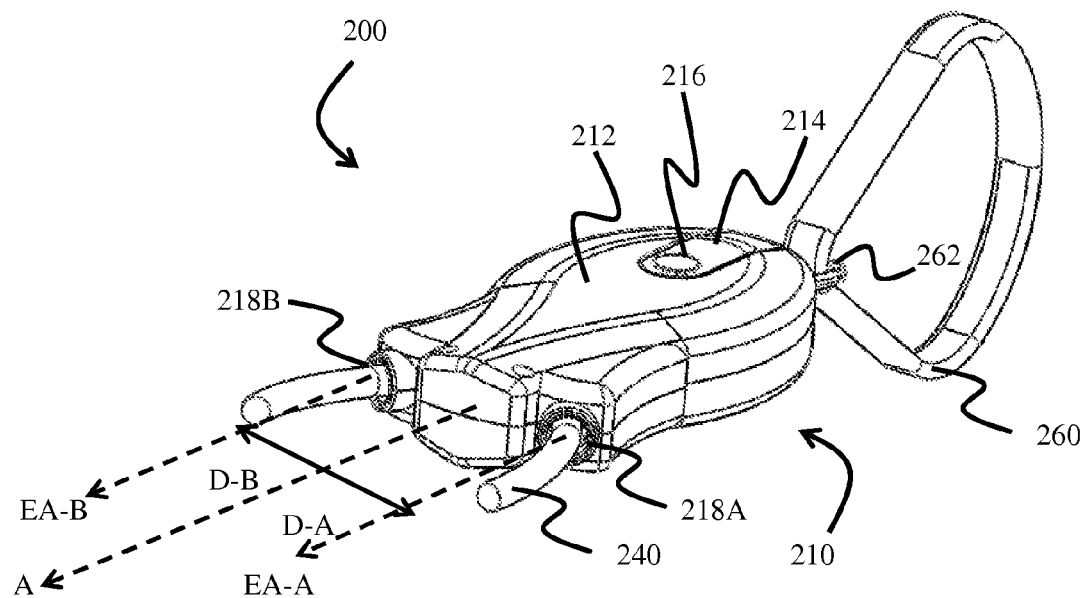
FIG. 2A is a top perspective view of one example embodiment of the multi-lead assembly illustrating assembly components and various axes pertinent to the devices ability to reducing tangling of the leads.

Referring to an example embodiment of the lead assembly 200 in FIG. 2A, the body subassembly 210 generally couples components of this example embodiment of detangling lead assembly 200 together. In this embodiment, the body subassembly 210 comprises a housing having an outer shell 212, a retaining clip 214 and a pulley axle. In this embodiment, the pulley axle is a binding post 216 extending through holes in both sides of the retaining clip 214 and through the pulley wheel (not shown), retaining the pulley wheel in the retaining clip 214. When secured to the retaining clip 214 with the binding post 216, the pulley wheel functions like a pulley. The binding post 216 and the retaining clip 214 may also assist in fastening the components of the outer shell 212. In this embodiment, the body subassembly houses a portion of the lead 240 and the pulley wheel and helps define the lead path from one eyelet 218A around the pulley wheel out through the other eyelet 218B.

The lead 240 is a generally elongated flexible type of material such as, but not limited to a rope, cord, strapping or any material appropriately sized to retain what is secured at the end of the lead 240. Suitable materials for the lead include but are not limited to cords or straps in nylon, polyester, natural fiber or any other flexible and relatively durable material.

Embodiments of the detangling lead assembly may also comprise an anchoring subassembly to secure the proximal end of the body subassembly to an item such as a person or equipment. A coupler provides a means to rotatably anchor the body subassembly to an anchor such as a hand whereby the body subassembly can rotate in relation to the anchor and in reaction to one or more moments to avoid the first lead portion wrapping around the second lead portion. In some embodiments, such as in FIG. 2A, the anchoring subassembly may comprise a handle subassembly 260 rotatably coupled to the body subassembly 210 with a swivel handle coupler 262.

As shown in FIG. 2A, the body subassembly 210 rotates about a central longitudinal assembly axis A. As shown, the rotation of the body subassembly 210 about the assembly axis A can be caused by moments created by the lead 240 putting a force on portions of the body subassembly 210. In this embodiment, the lead 240 typically creates a rotational force by putting a force on one or more of the inside edges of the eyelets 218A and 218B of the body assembly 210. For example, to illustrate the rotational force, the location of the eyelets parallel to the assembly axis A (here shown as eyelet axis EA-A and eyelet axis EA-B) are at a distance D-A and D-B from the assembly axis A. When the lead 240 puts a force on the inside edge of the eyelets, this force urges the body subassembly 210 to rotate in the direction of the force.

Figure 2B:
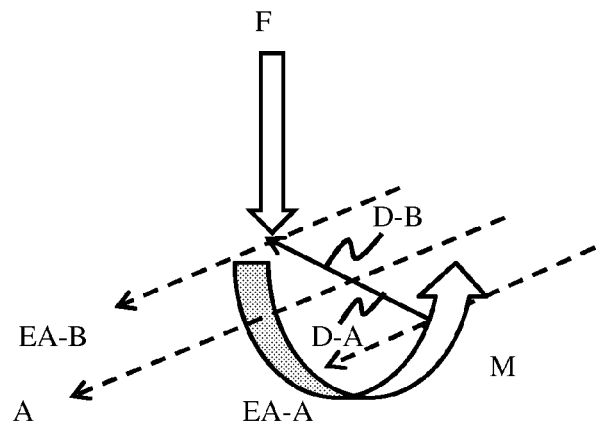
FIG. 2B is a top perspective diagram of the axes of FIG. 2A illustrating the forces and moments utilized by this embodiment of the multi-lead assembly.

Consistent with the description above and the embodiment of FIG. 2A, FIG. 2B shows the force F applied at the distance D-B from the assembly axis A where distance D-B acts as a moment arm and creates the moment M equal to F multiplied by (D-B) where the moment M is the measure of its tendency to cause a body to rotate about a specific point or axis. The moment arm D-B, or lever arm, is the perpendicular distance between the line of action of the force (EA-B) and the center of the moment, here assembly axis A so that the moment A causes the body subassembly 210 to rotate about the axis A.

These embodiments are different than the embodiment of Parker where the moment arm of any moment is defined generally by the distance from the axis of rotation of the pulley wheel to the point where the lead puts force on the pulley wheel. In Parker, this distance is dependent on the positioning of the lead around the pulley. For example, if the ends of the lead come off of the pulley in parallel, the lead wraps half-way around the pulley wheel and the moment arm distance is consistent with the distance from the center of the pulley wheel to the inside surface of the pulley wheel, or the pulley wheel radius. If the ends of the lead diverge, as would be typical when walking pets, the lead would not wrap half-way around the pulley wheel and the moment arm distance from the axis of pulley wheel rotation to the point where the lead puts force on the pulley wheel would be less than the inside radius of the pulley wheel. As shown the embodiment of FIG. 2A, the moment arm D-B is defined by the distance from the assembly axis A to the eyelet 218B (here extended as EA-B). In some embodiments, when the distance between the eyelets 218A and 218B, as an offset distance, is greater than the diameter of the inside surface of the pulley wheel, this provides for a larger moment arm than the diameter of the inside surface of the pulley wheel and therefore a larger moment to cause the body subassembly 210 to rotate about the assembly axis A.

The above described embodiments are also different than leash assemblies such as U.S. Pat. No. 4,879,972, filed Aug. 15, 1988 to Dennis Crowe et al. entitled "DOUBLE PET WALKER" ("Crowe") with a single swivel connector to couple the handle subassembly to the ends of the leads. Embodiments similar to Crowe have a smaller moment arm created by the twisting of the end of the lead and therefore the force to detangle the assembly is smaller than with a large moment arm. The embodiments described herein also provide more freedom of movement than the embodiments of Crowe. Crowe allows two pets to only diverge to the length of their leashes from the single swivel connector. For leashes of similar lengths, if the single swivel connector of Crowe is placed at a distance from the handle, the pet's ability to diverge from each other is limited as compared to having multiple leashes diverging at a point much closer to the handle as disclosed herein.

Figure 3A:
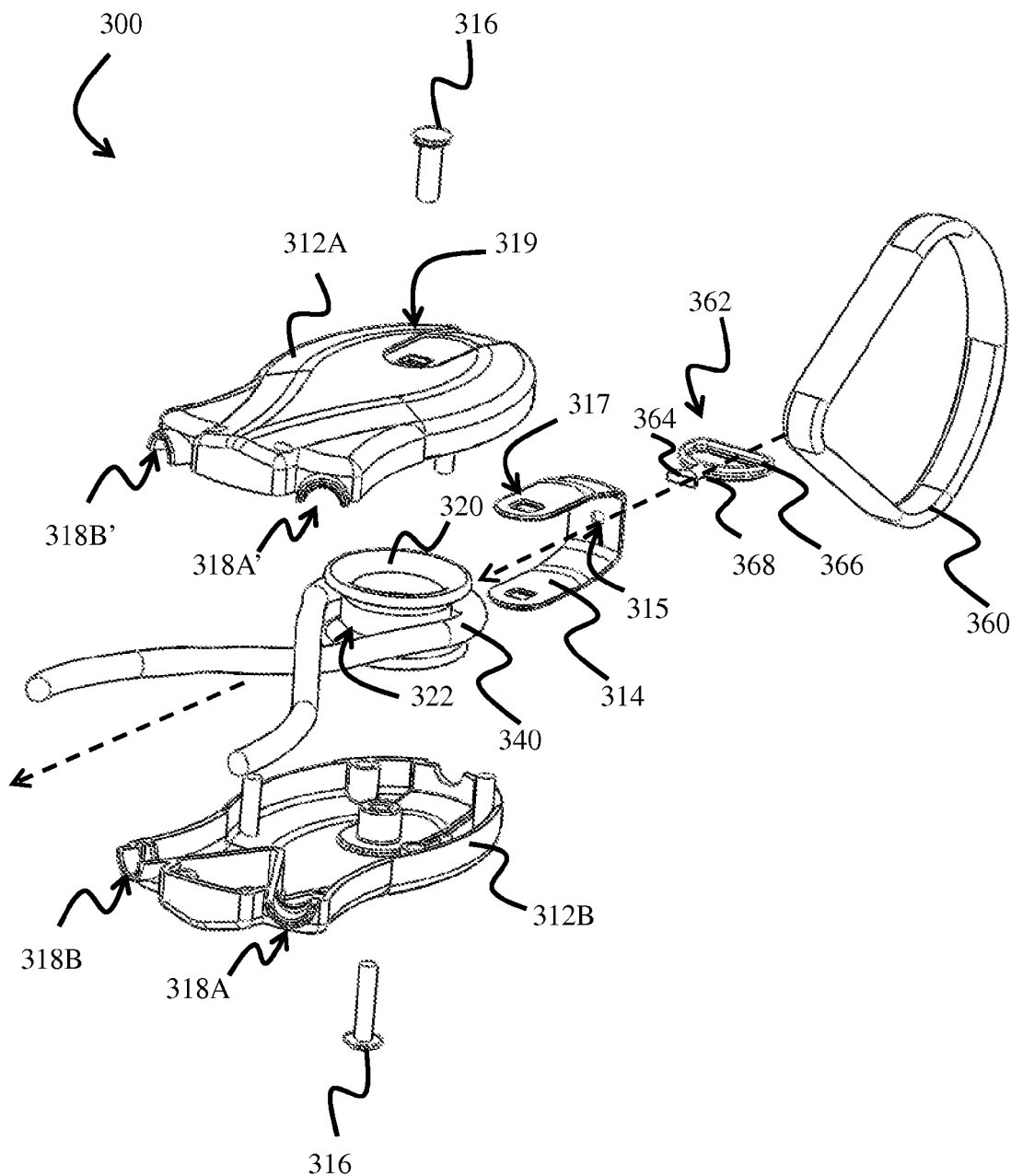
FIG. 3A is an exploded view of one example embodiment of the multi-lead assembly.
Figure 4:
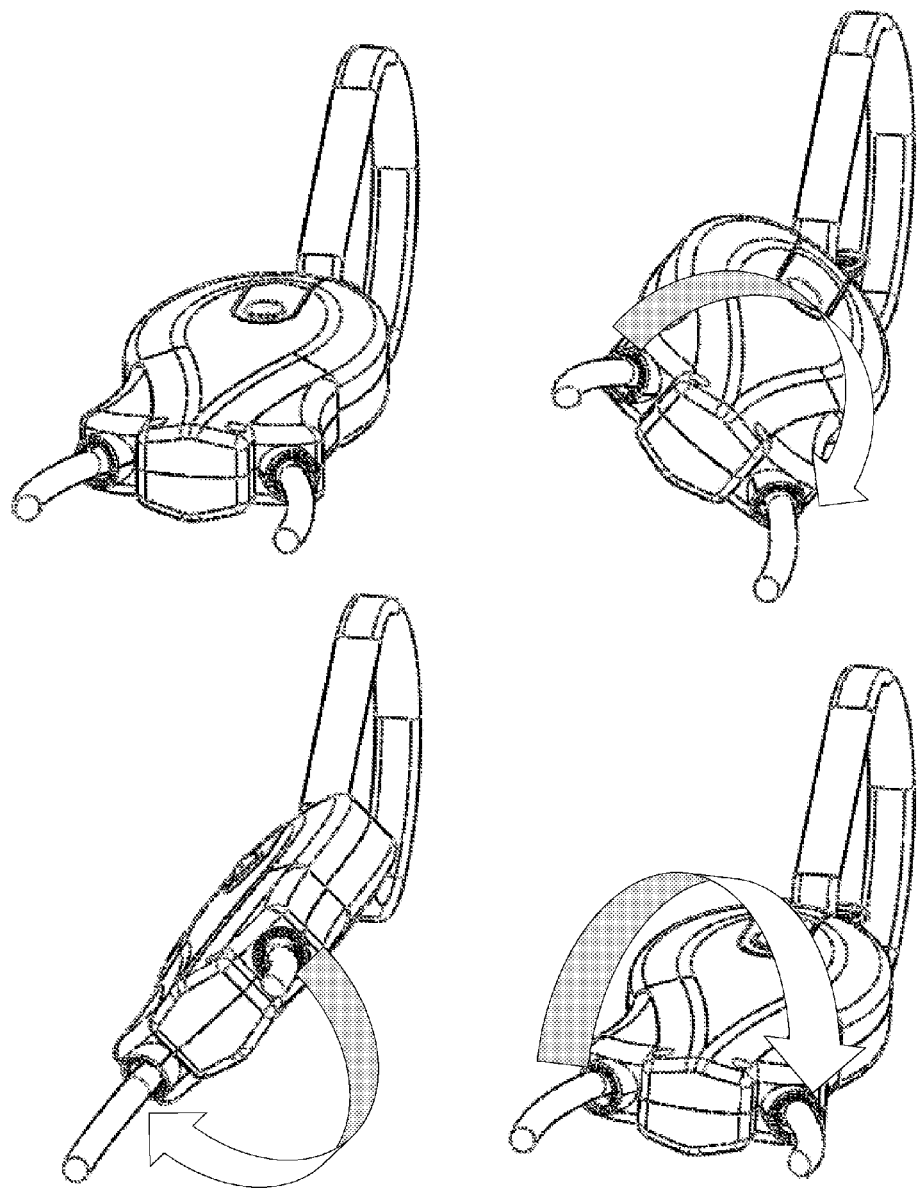
FIG. 4 is a top perspective view of one embodiment of the multiple pet leash assembly through various stages of rotation.
Figure 5:
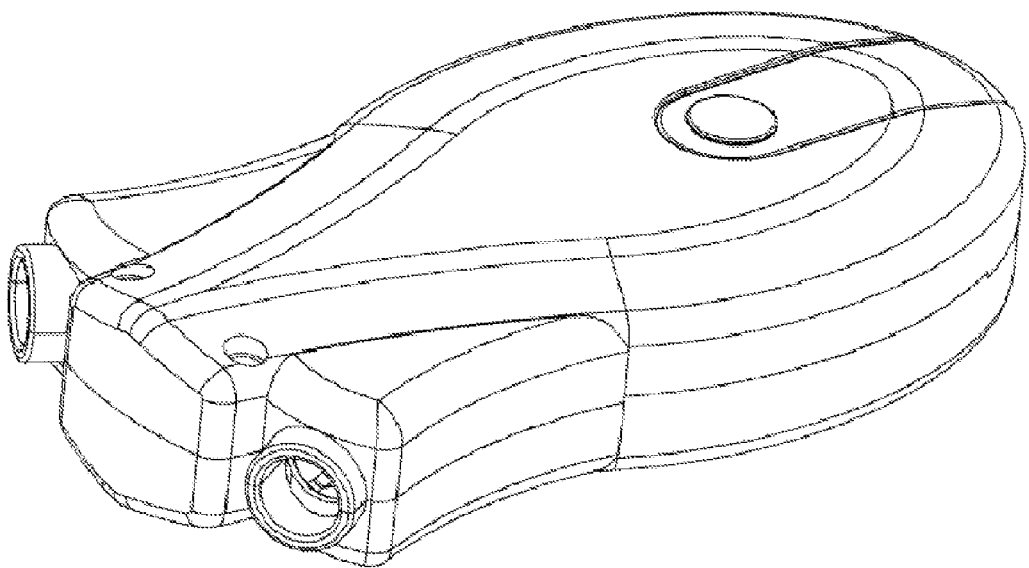
FIG. 5 is a top front perspective view of the design of one embodiment of a body subassembly of a detangling lead assembly.
Figure 6A:
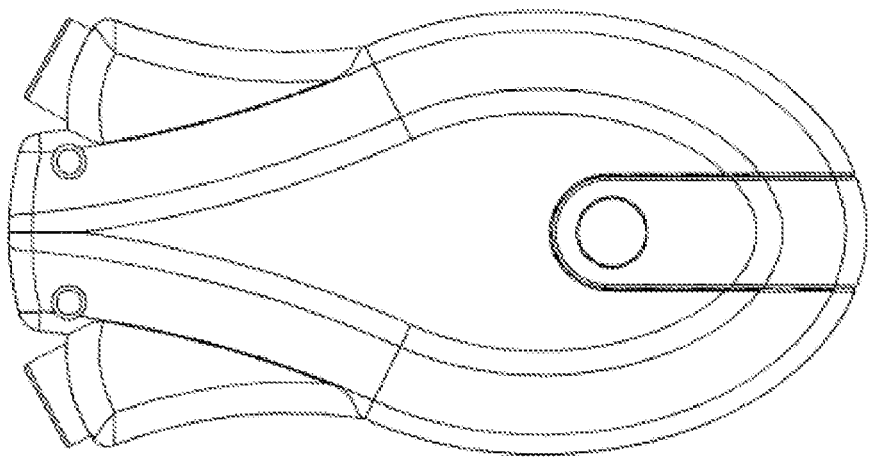
FIG. 6A is a top view of the design of one embodiment of a body subassembly of a detangling lead assembly.
Figure 6B:
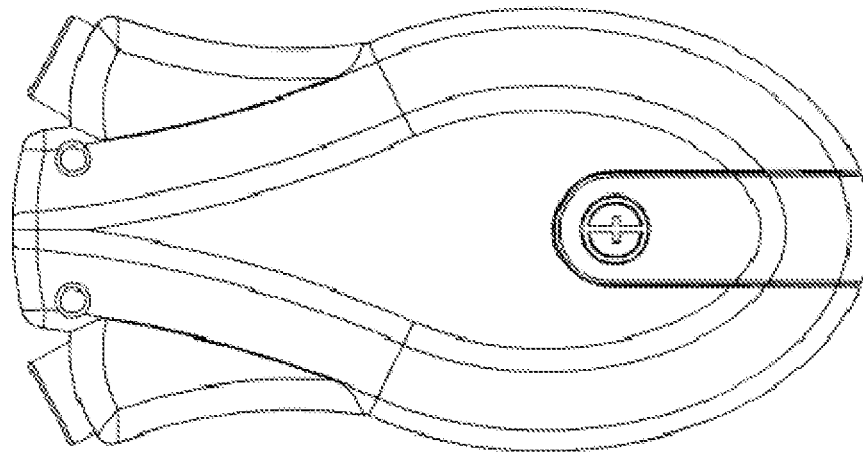
FIG. 6B is a bottom view of the design of one embodiment of a body subassembly of a detangling lead assembly.
Figure 6C:
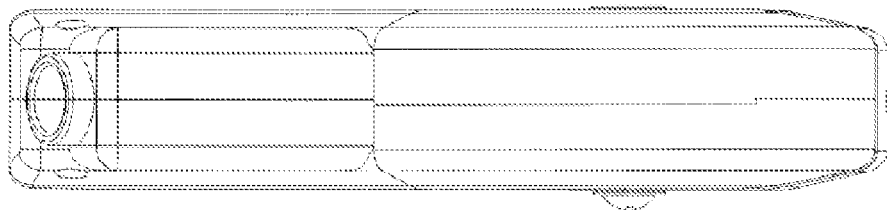
FIG. 6C is a side view of the design of one of embodiment of a body subassembly of a detangling lead assembly, the other side view being a mirror image.
Figure 7A:
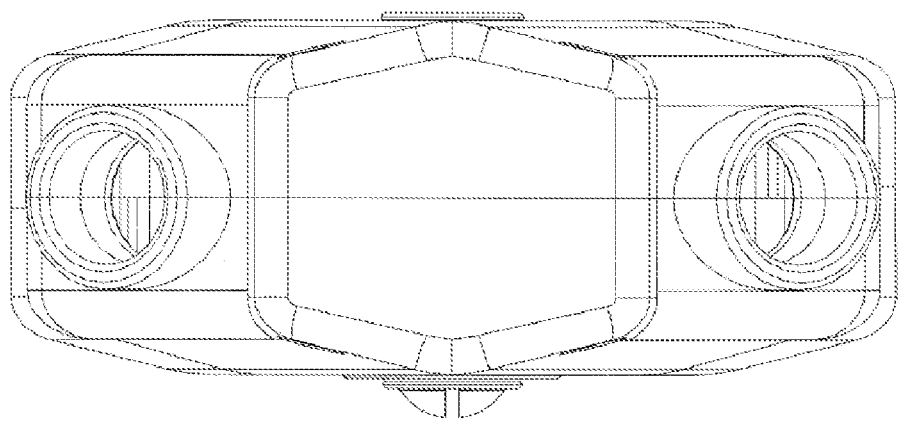
FIG. 7A is a front view of the design of one embodiment of a body subassembly of a detangling lead assembly.
Figure 7B:
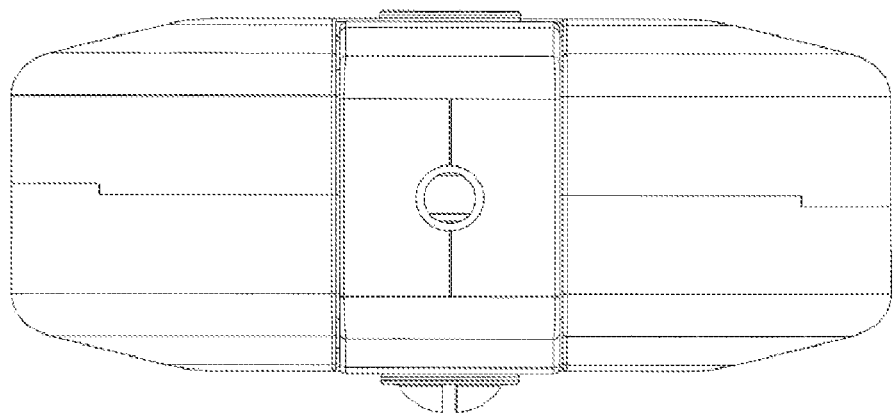
FIG. 7B is a rear view of one embodiment of the design of a body subassembly of a detangling lead assembly.

One example embodiment of detangling lead assembly in an exploded view is shown in FIG. 3A. This illustrative example embodiment, a multi-pet leash assembly 300, may be used for walking two pet simultaneously and generally comprises a body subassembly, a lead, a handle and a rotatable coupler.

As shown, the body subassembly comprises a retainer clip 314, a binding post 316 and a housing having two shell halves 312A and 312B. In this embodiment, the two shell halves share the same shell half design. The retainer clip 314 is configured to couple the body subassembly to the anchor subassembly, or here, the handle subassembly 360. As shown, the retainer clip 314 is a U-shaped clip with a hole 315 in its proximal end to provide a mating connection to couple with the handle coupler 362 and two holes 317 in its distal end to receive the binding post 316. In this embodiment, the retainer clip 314 is configured to help secure the two shell halves 312A and 312B together. The retainer clip 314 also receives the binding post 316 which goes through shell halves 312A and 312B, securing them and also serving as the axle for the pulley wheel 320. In this embodiment, the design with the binding post 316 securing the pulley wheel 320 to the retainer clip 314, the handle connector 362 and handle subassembly 360 more securely secures the lead 340 to the handle subassembly 360 in the event other leash assembly components, such as the shells 312A and 312B, break and no longer provide support for the lead 140.

As shown in FIG. 3A, the pulley wheel 320, as a sheave, is housed in the body subassembly and the pulley wheel 320 may have groove with an inside groove diameter along its inside surface 322 for holding the lead 340 and defining the portion of the lead path that wraps around the pulley wheel 320.

It is understood that the retainer clip 314 may be any shape capable of coupling the handle subassembly 360 to the body subassembly. Although the embodiment shown has the retainer clip 314 on the exterior of the shell halves 312A and 312B, the retainer clip 314 may be embedded or otherwise secured to the body. It is also understood that the binding post 316 may be any type element to provide the function of the axle for the pulley wheel 320. For example, the binding post 316, or part of the binding post, may be molded into the inner surface of the one or more of the shell halves 312A and 312B.

In some embodiments, the body subassembly is configured to be easily disassembled with common tools such as a screwdriver or wrench whereby elements such as the lead 340 are removably retained in the assembly. In such embodiment, as is shown in FIG. 3A, the two shell halves 312A and 312B mate and the binding post 316 is a removable connector such as a screw. When the binding post 316 is removed with a screwdriver or a wrench, the retainer clip 314 can be removed from the body subassembly and the two shell halves 312A and 312B can be removed to expose the pulley wheel 320 and the lead 340. Assembly elements, such as the lead 340, can be replaced and the assembly can be reassembled.

As shown in FIG. 3A, the lead 340 generally illustrates the lead path from one of the eyelets 318A, wraps from the distal side of the pulley wheel 320, around the proximal side of the pulley wheel 320 towards the distal side, crosses back over the lead 340 at an overlap location distal to the pulley and exits from the other eyelet 318B. This crossing over of the lead 340 causes an overlap that allows for a normal divergence of the lead ends when they exit the exit points defined by eyelets 318A and 318B which help to increase the moment on the body assembly to cause it to rotate more easily when the paths of the leads/pets cross. When used with a body subassembly that is removable, as shown, the lead 340 can be easily replaced. In embodiment with a single lead, the pulling of one pet will reduce the slack the pets have. This crossing of the lead 340 also provides a diverging exit of the lead 340 from the body subassembly which aligns with pets that walk at a distance from each other. This overlap also provides a frictional engagement of an outside surface of the lead upon itself creating a resistance force opposite a pulling force on the lead. In some embodiments, the housing further comprises a lead channel defining the lead path through the body subassembly whereby the lead in the housing is less susceptible to tangling in the housing. In some embodiments, the overlap of the lead is aligned with an overlap throat of the lead channel defined by a restriction of the size of the interior surface of the body subassembly at the overlap throat whereby an inside diameter of the overlap throat frictionally engages the outside surface of the lead at the throat and increases the resistance force opposite the pulling force on the lead.

Referring back to FIG. 1A, the lead 140 extends from a coupling securing the pet to the lead assembly 100. As shown, the lead 140 is generally an elongated flexible member. In one embodiment, the lead 140 comprises a "super cord" solid core nylon cord for firmness (thus more body turn reaction), wear prevention and added strength. In some embodiments, the lead 140 further comprises stoppers that may be fixed to or adjustable along the length of the lead 140. The stopper may be any type of element or configuration of existing elements whose physical size provides a profile that restricts the freedom of movement of the lead 140 through the pulley wheel. In this embodiment, the stoppers comprise push pin stoppers 142A and 142B that slidably receive the lead but also can frictionally engage the lead 140 at different points along its length. The push pin stoppers 142A and 142B in this embodiment are frictionally disengaged from the lead 140 by pushing the pin and upon release of the pin, the push pin stoppers frictionally engage the lead 140. Stoppers are configured to have a stopper profile sized larger than the first and second eyelet whereby the first and second stoppers restrict the lead 140 at a stop point from being movable back and forth around the pulley. By moving these stoppers 142A and 142B along the lead 140, they define a first lead portion 140C, a second lead portion 140D and a middle lead portion. The first lead portion 140C extends at a first lead portion length from the first stopper 142A to the end of the first lead end 144A, the second lead portion 140D extends at a second lead portion length from the second stopper 142B to the end of the second lead end 144B and the middle lead portion extends at a middle lead portion length between the first stopper 142A and the second stopper 142B. The stoppers 142A and 142B provide a means for the user to adjust and change the length of the lead 140 for these portions and change the amount of the lead 140 available to that lead end. The lead 140 may be any length however in preferred embodiments for use as a leash with multiple pets, the length of the lead 140 is such that alone or with stoppers the lead does not provide too much length to allow the lead to have slack and dangle close to the pet allowing its legs to get tangled in the lead. In some embodiments, the total lead length is dependent upon the use of the assembly. When used with pets as a leash, the length of the lead may range between four (4) and fifteen (15) feet depending on the size of the pets. In some embodiments, the length is about twelve (12) feet and in some embodiments, the total lead length is about eight (8) to nine (9) feet with stoppers at about two (2) to three (3) feet from each end. As an example of one embodiment, the lead and swivel clip is four (4) feet from the distal end of the housing and stoppers are placed at fourteen (14) inches from the distal end of the housing. In this embodiment, the lead will allow a range of movement of the pets such that one pet may be up to sixty two (62) inches from the distal end of the housing while the other pet is four (4) feet from the housing. In some embodiments, the length of the lead is sized so that it complies with common pet leash ordinance requirements.

Figure 1B:
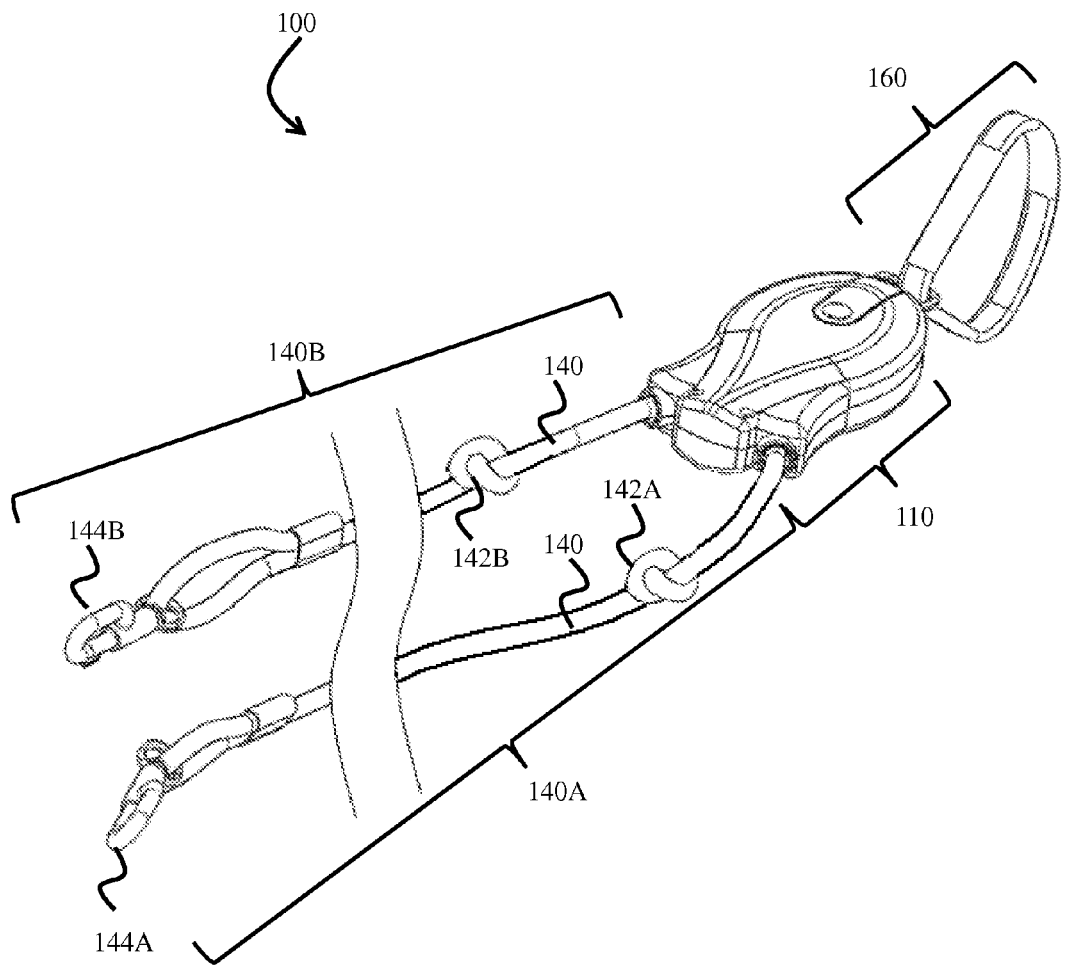
FIG. 1B is a top perspective view of one example embodiment of the detangling lead assembly, here a multiple pet leash assembly.

As shown in FIG. 1B, the stoppers may also comprise knots 142A and 142B tied in the lead 140. Embodiments with knots as stoppers still allow the stopper to be moved by untying and retying the knot. Embodiment with knots may also provide for a more rigid stopper if the material of the lead is more durable such as but not limited to climbing rope or super cord.

It is understood that the embodiment of the stoppers may be dependent upon the use of the lead assembly. For example, if the lead assembly is used with heavy loads in applications such as in firefighting rescues, the stoppers may need to be made from heavy duty material or metal to withstand those heavy loads.

Referring to FIG. 1A, in some embodiments, the lead 140 further comprises lead/leash end clips, such as lead swivel clips 144A and 144B, which couple the lead 140 to a pet collar. The swivel clips 144A and 144B on the ends of the lead keep the lead end from twisting upon itself. Although the swivel clips 144A and 144B in this embodiment are coupled to the distal ends of the lead 140 through a wide closed loop, it is understood that they may be coupled to the distal ends of the lead 140 with any type of direct connection or a connection securing the lead end to itself in a loop through the swivel clip. Examples of suitable connections include, but are not limited to a tight sewn connection, an adhesive connection, a taped connection, a knotted connection, a woven connection or a clamped/crimped connection.

Referring back to FIG. 3A, as shown, the anchor subassembly for this assembly comprises a handle subassembly 360. This handle subassembly 360 is preferably made from flexible material formed into a loop configured to receive a person's hand. For example, the handle subassembly 360 may be made from ½ inch nylon strapping sewn into about a 12 inch long loop and the loop is received in the "D" shaped end ring 366 of handle coupler 362. In one embodiment of the handle subassembly comprising a flexible loop, the proximal end of the loop is configured to fit around the top of the wrist of a user with the distal end of the loop extending around the wrist and through the palm of the user. Although the flexible loop embodiment of the handle subassembly is a preferred embodiment because of the ease it can be securely held, it is understood the handle subassembly 360 may comprise any type or shape of element that allows a person to grab and hold onto the handle subassembly 360. For example, the handle subassembly 360 may also comprise, either hardened or flexible, a handle, a loop or a t-shaped retainer.

The handle coupler 362 is configured to rotatably couple with the retaining clip 314 and the handle subassembly 360 whereby the retainer clip 314 and the rest of the body subassembly, can rotate or swivel relative to the handle subassembly 360. As shown, the handle coupler 362 has a "D" shaped proximal end ring 366 to retain the anchor subassembly such as the handle subassembly 360 shown. The distal end of the handle coupler 362 has a shank 368 that can fit through the hole 315 in the retaining clip and tines 364 or any other type of retainer that hold the handle coupler 362 in the retaining clip 314. It is understood that the handle coupler 362 may be any type of coupler that can rotatably couple the anchor subassembly to the body subassembly. For example, the handle coupler 362 may be a typical swivel connector on the end of a typical swivel clip used with dog leashes.

In some embodiments, the handle coupler is configured to rotatably couple the retaining clip and the handle subassembly in a manner that restricts movement of the handle subassembly in directions other than rotating about the longitudinal axis of the assembly. These more restrictive coupling embodiments generally limit the flapping up and down or dangling of the housing relative to the handle subassembly but do not limit the ability for the two components to rotate relative to each other. For example and not for limitation, as shown in FIG. 3B, one example embodiment comprises the handle coupler 362 comprises an end ring 362A with a distal end 362B having a collar 362C shaped to receive a neck shank 368. The neck shank 368 is configured to be retained in the collar 362C between an enlarged diameter of a shank cap 367 and by mating with shank coupler 369, here an externally threaded connector mating with internal threads in the neck shank having an enlarged distal end. On the distal end 362B of the end ring 362A or collar 362C, there is a broad, generally planar exterior surface to align with the broad generally planar exterior surface of the proximal end of the retaining clip (not shown) when the shank couple 369 secures the retaining clip to the handle subassembly (not shown). This generally parallel alignment, when the coupling of the distal end 362 to the retaining clip is tight, leaving minimal space between the two surfaces, reduces movement of the handle coupler 362 except for a rotational movement. Similarly, movement of the handle subassembly in directions other than rotation about the longitudinal axis of the assembly can be obtained by the extension of the shank 368 through the collar 362C integral to the coupler 362 as shown such that the tight fit of the shank 368 within the collar 362C restrains movement of the shank 368 and the clip which restrains movement of the body subassembly. As shown, the tight mating of the exterior size of the neck shank 368 and the inner surface of the collar 362C may also reduce the movement of the handle coupler 362 in relation to the housing except for a rotational movement. Either method of tightly coupling these elements may restrict movement of the housing and the handle subassembly in directions other than rotation and assist in allowing the rotational axis of the assembly to be more in alignment with the direction the lead assembly will need to rotate to prevent tangling of the leads. This more restrictive coupling also aids in the ergonomics of the assembly. Alternative examples or restrictive coupling are illustrated in FIG. 3C where the shank coupler 369 is an open elastic retaining ring to be secured around a circumferential channel in the proximal end of the neck shank 368 and in FIG. 3D where the neck shank 368 is received in the recess 362C from the distal end 362B of the end ring 362A and the shank couple 369 is received in the proximal end of the collar 362C. It is understood that in these embodiments with a more restrictive handle coupler, any type of coupling elements may be used to couple the housing to the handle subassembly in a manner that restricts movement of the two elements in directions other than rotation. For example and not for limitation, coupling elements may include bolts with nuts and washers or rivet type connectors that go through holes or rings in the retaining clip and the proximal end of the handle coupler may also be utilized. Examples of suitable restrictive swivel connections are also illustrated in the embodiments of the rotatable coupling of the shank to the collar and shackle as disclosed in U.S. Pub. No. 2007/0193005 to Craig John Chalk published Aug. 23, 2007 and entitled "Pet Lead and Systems for Selection Thereof" ("Chalk") which is herein incorporated by reference in its entirety.

In some embodiments, the lead assembly may be configured to be disassembled by the user for replacement of assembly components such as replacement of the lead with a replacement lead. As shown in FIG. 3A, the lead assembly 300 has two shell halves 312A and 312B of the body subassembly coupled through the use of the retaining clip 314 and the binding post 316. The pulley wheel 320 with the lead 340 wrapped around it are configured to fit within the body subassembly and the lead 340 is configured to follow the lead path of the body subassembly. The two shell halves 312A and 312B are configured to mate around the pulley wheel 320 and the lead 340. The two shell halves 312A and 312B may be further secured with the retaining clip 314 and further secured when the binding post is received through the retaining clip 314 and holes 319 through the two shell halves 312A and 312B. The binding post 316 may have exterior surfaces, such as screw indents or other exterior shapes, to accept tools to help disassembly the lead assembly.

In some embodiments, the lead assembly may utilize elements similar to the swivel snaps of Parker positioned at intermediate points of the lead to restrict the ability of the lead ends to diverge. This may be helpful in safety situations where more control of pets on the lead ends is desirable.

In some embodiments, the lead assembly may further comprise an accessory connector coupled to the housing or body subassembly to connect accessories such as a light, plastic bag holder or other accessory to the body subassembly.

FIGS. 5, 6A-6C, 7A and 7B illustrate the ornamental design of one embodiment of the body subassembly of the detangling lead assembly.

The above describe embodiments are also different than leash assemblies that have to accommodate retractable hardware. Accommodating retractable hardware makes manufacturing more difficult and introduces more points of failure for the device. These devices are also expected to be more difficult to disassemble for easy replacement of device components by a common, non-mechanic user.

One Embodiment of the Detangling Lead Assembly in Operation:

To illustrate the operation of some embodiment of the detangling lead assembly, an embodiment for use with multiple pets, consistent with the embodiments in FIGS. 1-3 will be described. It is understood that these example multi-pet leash assembly embodiments are used for illustration and not for limitation.

One example embodiment of the detangling lead assembly generally comprises the steps of providing a detangling lead system. Utilizing the embodiment of FIG. 1A as an illustrative example, the user uses the handle subassembly 160 with one of their hands. The user connects one pet to the assembly by connecting the swivel connector 144A to a ring on the pet's collar. The user then connects another pet to the assembly 100 by connecting the other swivel connector 144B to a ring on that pet's collar. If desired, the user can move stoppers 142A or 142B up or down the lead to define the first lead portion or second lead portion and restrict the middle portion of the lead that can move within the lead path of the body assembly. For example, if the first pet is a smaller pet than the second pet, the user may move the stopper on the second pet's portion of the lead closer to the eyelet so that the larger pet has more length of the lead 140 to move. As another example, if the lead is about 10 feet long and the pet leash ordinance limits leash lengths to 6 feet, the stoppers can be moved to generally about 4 feet from either end so that no more than 6 feet of leash is extended to one pet. If the stopper is a push pin stopper, or if the stopper is a knot, the stopper may be adjusted along the length of the lead as needed.

This embodiment allows for two animals to move forward and back and to cross behind or in front of each other without tangling the extended lead ends. The single lead comprising a single rope with two exiting extensions is twisted over itself around the pulley to create a certain degree of friction and tension. The angle of the lead from the pulley through the eyelets also conforms to a more natural angle of the pets walking in relation to each other and crates less friction between the eyelets and the lead. The two extending lengths may also have movable stoppers, such as knots or clips that restrict the amount of lead that can be pulled through the housing of the body subassembly.

In some embodiments, the lead assembly may be configured to be easily disassembled with common tools such as a screwdriver or wrench allowing replacement of parts such as, but not limited to, the lead. The embodiment of FIG. 2A will be used to illustrate an example of disassembling a lead assembly. Disassembly would start by removing the binding post 216 from the body subassembly 210. In this embodiment, the binding post comprises two elements (one below the body subassembly not shown) coupled by using a mating connection between the two. For example, one element may have a female threaded end to receive a mated male threaded end from the other element. On the outside ends of the binding post 216, a recess to fit a tool such as a screwdriver head or protrusions to fit a tool such as a wrench enables the tool to engage and turn the binding post and removing it from the body subassembly. The retaining clip 214 may then be pulled off of and removed from around the halves of the housing 212 of the body subassembly 210 allowing the halves to be separated. Referring to the example of FIG. 3A, once the halves 312A and 312B are separated, this opens up the lead path and exposes the lead 340 and the pulley wheel 320. The lead 340 can then be removed from around the pulley wheel 320 and a new lead can be place in the lead path and around the pulley wheel 320. The two shell halves 312A and 312B can be placed back together, the retaining clip 314 can be placed back around the housing and the binding post 316 can be placed through the retaining clip 314 and through the shell halves 312A and 312B to couple the lead assembly elements together. It is understood that many other methods of coupling the lead assembly elements together may be used.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

We claim:

1. A detangling lead assembly comprising:
a handle subassembly rotatably coupled to a proximal end of a body subassembly;
an elongated flexible lead having a first lead end and a second lead end;
the body subassembly comprising a pulley;
and the lead following a lead path from a distal end of the body subassembly, around the pulley and extending from the distal end of the body subassembly
whereby the first lead end and the second lead end extend generally in a distal direction from the handle subassembly and the lead is generally movable back and forth around the pulley;
and the lead path through the body subassembly causes an overlap of the lead in an overlap location distal to and off of a surface of the pulley
wherein the body subassembly further comprising a housing;
wherein the housing has a distal end having a first and a second lead eyelet defining a first and a second exit point respectively for the lead from the housing;
the first and the second lead eyelets are separated by an eyelet offset distance between an inside edge of the first and the second lead eyelets and the eyelet offset distance is greater than an inside groove diameter of the pulley;
and the eyelet offset distance defines an eyelet moment arm greater than a pulley moment arm defined by the inside groove diameter of the pulley whereby an eyelet moment force from the lead on the housing is greater than a pulley moment force on the pulley.

2. The detangling lead assembly of claim 1 wherein the pulley is configured to freely rotate in both directions.

3. The detangling lead assembly of claim 1 wherein the lead is only partially wrapped around a circumference of an inside groove of the pulley.

4. The detangling lead assembly of claim 1 wherein the overlap of the lead over itself is configured to provide a frictional engagement of an outside surface of the lead against itself creating a resistance force opposite a pulling force on the lead.

5. The detangling lead assembly of claim 1, wherein a handle coupler is configured to provide a coupling that restricts movement of the handle subassembly in directions other than rotation about a longitudinal axis of the detangling lead assembly.

6. The detangling lead assembly of claim 1 wherein:
the overlap of the lead is configured to provide a frictional engagement of an outside surface of the lead against itself creating a resistance force opposite a pulling force on the lead; and
the housing further comprises a lead channel defining the lead path through the body subassembly.

7. The detangling lead assembly of claim 6 wherein the overlap of the lead is aligned with an overlap throat of the lead channel whereby an inside diameter of the overlap throat frictionally engages the outside surface of the lead and increases the resistance force opposite the pulling force on the lead.

8. The detangling lead assembly of claim 1, wherein: the detangling lead assembly is configured to attach to multiple pets;
the housing comprises two shell halves sharing a same shell half design;
the two shell halves are removably coupled and the lead is removably retained in the lead path whereby the lead can be removed and replaced with a replacement lead;
the first lead end and the second lead end each further comprise a lead swivel clip whereby the lead can be rotatably coupled to a pet collar and reduce a twisting of the lead;
the first lead end and the second lead end further comprise a first and a second lead stopper respectively configured with a stopper profile sized larger than the first and the second lead eyelets whereby the first and the second lead stoppers restrict the lead at a stop point from being movable back and forth around the pulley;
and the handle subassembly comprising a flexible loop strap.

9. A lead assembly comprising: a body subassembly;
a single lead received in the body subassembly;
the single lead having a first lead end and a second lead end;
the first lead end extending from the body subassembly at a first lead end length and the second lead end extending from the body subassembly at a second lead end length;
a means to adjust the first lead end length and the second lead end length;
and a means to rotatably anchor the body subassembly whereby the body subassembly rotates in reaction to one or more moments to avoid the first lead end wrapping around the second lead end;
the means to adjust the first lead end length and the second lead end length comprises a pulley wheel rotatable coupled to the body subassembly;
a lead path extending through the body subassembly and around the pulley wheel whereby the lead path causes an overlap of the lead over itself in an overlap location distal to and off of a surface of the pulley wheel;
the overlap of the lead over itself is configured to provide a frictional engagement of an outside surface of the lead against itself creating a resistance force opposite a pulling force on the lead
wherein the body subassembly further comprises a first and a second lead eyelet defining a first and a second exit of the lead path from a distal end of the body subassembly;
the first and the second lead eyelets are separated by an eyelet offset distance between an inside edge of the first and the second lead eyelets;
and the eyelet offset distance is greater than an inside groove diameter of the pulley wheel.

10. The lead assembly of claim 9, wherein:
the single lead received in the body subassembly within the lead path;
the lead path comprising a channel from the distal end of the body subassembly, around the pulley wheel and extending to the distal end of the body subassembly whereby the first lead end and the second lead end extend from the body subassembly;

and the overlap of the lead over itself occurs within the body subassembly.

11. The lead assembly of claim 9 wherein:
the body subassembly comprises a housing having two shell halves;
the two shell halves having a same shell half design;
the two shell halves are removably coupled; and
the lead is removably retained in the lead path whereby the lead can be removed and replaced with a replacement lead when the two shell halves are removed.

12. The lead assembly of claim 9, wherein:
the eyelet offset distance defines an eyelet moment arm greater than a pulley moment arm defined by the inside groove diameter of the pulley wheel whereby an eyelet moment force from the lead on the body subassembly is greater than a pulley moment force on the pulley wheel.

13. The lead assembly of claim 9 wherein:
the lead assembly is configured to attach to multiple pets;
the means to rotatably anchor the body subassembly comprises a handle coupler rotatably coupling a handle subassembly to the body subassembly;
the handle coupler is configured to provide a coupling that restricts movement of the handle subassembly in directions other than rotation about a longitudinal axis of the lead assembly; and
the means to adjust the first lead end length and the second lead end length further comprises the first lead end and the second lead end having a first and a second lead stopper respectively configured with a stopper profile sized larger than the first and the second lead eyelet whereby the first and the second lead stoppers restrict the lead at a first and a second stop point further restricting the lead from being movable back and forth around the pulley wheel.

14. A rotatable lead assembly comprising:
a handle subassembly rotatably coupled to a proximal end of a body subassembly;
an elongated flexible lead having a first lead end and a second lead end;
the body subassembly comprising a pulley;
the lead following a lead path from a distal end of the body subassembly, around the pulley and extending from the distal end of the body subassembly whereby the first lead end and the second lead end extend generally in a distal direction from the handle subassembly;
the body subassembly having a distal end having a first and a second lead eyelet defining a first and a second exit point respectively for the lead from the body subassembly;
the first and the second lead eyelets are separated by an eyelet offset distance between an inside edge of the first and the second lead eyelets and the eyelet offset distance is greater than an inside groove diameter of the pulley;
the eyelet offset distance defines an eyelet moment arm about a longitudinal axis of the body subassembly;
the inside groove diameter of the pulley defines a pulley moment arm about the longitudinal axis of the body subassembly;
and the eyelet moment arm is greater than the pulley moment arm whereby an eyelet moment force from the lead on the body subassembly is greater than a pulley moment force on the pulley and the body subassembly is urged to rotate in relation to the handle subassembly
wherein the lead path through the body subassembly causes an overlap of the lead in an overlap location distal to and off of a surface of the pulley.

15. The rotatable lead assembly of claim 14, wherein the overlap of the lead over itself is configured to provide a frictional engagement of an outside surface of the lead against itself creating a resistance force opposite a pulling force on the lead.

16. The rotatable lead assembly of claim 14 wherein the pulley is configured to freely rotate in both directions.

17. The rotatable lead assembly of claim 14 wherein:
the handle is coupled to the body subassembly by a handle coupler; and
the handle coupler is configured to provide a coupling that restricts movement of the handle subassembly in directions other than rotation about the longitudinal axis of the rotatable lead assembly.

* * * * *